(12) United States Patent
Otokuni

(10) Patent No.: US 7,180,085 B2
(45) Date of Patent: Feb. 20, 2007

(54) IMAGE INFORMATION READING APPARATUS

(75) Inventor: Shinji Otokuni, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 779 days.

(21) Appl. No.: 10/244,396

(22) Filed: Sep. 17, 2002

(65) Prior Publication Data

US 2003/0058485 A1 Mar. 27, 2003

(30) Foreign Application Priority Data

Sep. 26, 2001 (JP) .............................. 2001-293305
Mar. 28, 2002 (JP) .............................. 2002-092521

(51) Int. Cl.
*G03B 42/08* (2006.01)

(52) U.S. Cl. ...................... 250/584; 250/580; 250/581; 250/585; 250/586

(58) Field of Classification Search ................ 250/580, 250/581, 584, 585, 586
See application file for complete search history.

(56) References Cited

U.S. PATENT DOCUMENTS

| | | | | |
|---|---|---|---|---|
| 4,710,637 A | * | 12/1987 | Luckey et al. | 250/486.1 |
| 4,835,397 A | * | 5/1989 | Arakawa et al. | 250/484.4 |
| 4,876,452 A | * | 10/1989 | Horikawa | 250/585 |
| 5,115,132 A | * | 5/1992 | Saotome et al. | 250/590 |
| 5,124,829 A | * | 6/1992 | Ishikawa | 359/204 |
| 5,541,421 A | * | 7/1996 | Brandt et al. | 250/586 |
| 5,841,148 A | * | 11/1998 | Some et al. | 250/584 |
| 6,239,448 B1 | * | 5/2001 | Kawai | 250/586 |
| 6,310,357 B1 | * | 10/2001 | Fuchs et al. | 250/587 |
| 6,495,849 B2 | * | 12/2002 | Yasuda | 250/584 |
| 6,507,039 B2 | * | 1/2003 | Gebele et al. | 250/584 |
| 6,809,331 B2 | * | 10/2004 | Yamazaki et al. | 250/584 |

FOREIGN PATENT DOCUMENTS

| | | |
|---|---|---|
| JP | 64-032387 | 2/1989 |
| JP | 04-003147 | 1/1992 |
| JP | 04-003147 A | 1/1992 |
| JP | 04-320251 A | 11/1992 |
| JP | 05-207998 A | 8/1993 |
| JP | 2001-119537 A | 4/2001 |

* cited by examiner

*Primary Examiner*—David Porta
*Assistant Examiner*—Mark R. Gaworecki
(74) *Attorney, Agent, or Firm*—Sughrue Mion, PLLC

(57) ABSTRACT

A reading assembly includes a stimulating light beam system having a plurality of laser diodes and a CCD line sensor having a plurality of CCDs. The laser diodes and the CCDs are disposed in a predetermined range of distances from the stimulable phosphor sheet along a main direction in order to cope with a deformation of the stimulable phosphor sheet in the main direction.

15 Claims, 9 Drawing Sheets

IMAGE INFORMATION READING APPARATUS

BACKGROUND OF THE INVENTION

1. Field of the Invention

The present invention relates to an image information reading apparatus having a reading assembly for applying a stimulating light beam in a main direction to a stimulable phosphor sheet which has recorded thereon radiation image information of a subject and reading photo-stimulated light emitted from the stimulable phosphor sheet in response to the applied stimulating light beam, and an auxiliary scanning system for feeding the reading assembly and the stimulating light beam relatively to each other in an auxiliary direction which is substantially perpendicular to the main direction.

2. Description of the Related Art

There are known systems for either reproducing radiation image information of a subject such as a human body on a photographic photosensitive medium or the like, or outputting the radiation image information as a visible image on a CRT or the like, using a stimulable phosphor which, when exposed to an applied radiation (X-rays, $\alpha$-rays, $\beta$-rays, $\gamma$-rays, electron beams, ultraviolet radiation, or the like), stores a part of the energy of the radiation, and, when subsequently exposed to applied stimulating rays such as visible light, emits photo-stimulated light in proportion to the stored energy of the radiation.

Specifically, radiation image information of a subject such as a human body is temporarily recorded on a stimulable phosphor sheet which has a stimulable phosphor layer. When a stimulating light beam such as a laser beam or the like is applied to the stimulable phosphor sheet, the stimulable phosphor sheet emits photo-stimulated light that is commensurate with the recorded radiation image information. The photo-stimulated light is photoelectrically read and converted into an image signal, which is processed to output (reproduce) a visible image based on the radiation image information on a recording medium such as a photographic photosensitive medium or a display unit such as a CRT. Various apparatus which record and output such radiation image information are used in the art.

The above apparatus incorporate a reading assembly which comprises a stimulating system for applying a stimulating light beam to a stimulable phosphor sheet to scan the stimulable phosphor sheet two-dimensionally, and a light collecting system for photoelectrically reading photo-stimulated light emitted from the stimulable phosphor sheet in response to the applied stimulating light beam. In order to read radiation image information carried by the stimulable phosphor sheet with high accuracy, the distance between the stimulating system and the stimulable phosphor sheet, and the distance between the light collecting system, e.g., photoelectric transducers such as CCDs (Charge-Coupled Devices), and the stimulable phosphor sheet need to be set to accurate values.

If the distance between the stimulating system and the stimulable phosphor sheet is varied while the photo-stimulated light emitted from the stimulable phosphor sheet is being read, then the stimulating light beam tends to be brought out of focus on the stimulable phosphor sheet. If the distance between the light collecting system and the stimulable phosphor sheet is varied while the photo-stimulated light emitted from the stimulable phosphor sheet is being read, then the light collecting efficiency changes and the image density varies, failing to obtain the recorded radiation image information accurately. If the above distances remain unchanged, but are too large or too small, then the outputted image suffers an overall quality reduction.

Attempts have heretofore been made to alleviate the above shortcomings. For example, there has been proposed a mechanism (hereinafter referred to as "conventional arrangement 1") to support one side of a stimulable phosphor sheet on a flat guide plate and nip the stimulable phosphor sheet with a roller or the like to press the stimulable phosphor sheet against the guide plate, thus positionally confining the stimulable phosphor sheet. According to another structure (hereinafter referred to as "conventional arrangement 2"), two paired rollers are disposed one on each side of a position where a stimulating light beam is applied to a stimulable phosphor sheet in a main scanning direction, and the rollers are rotated to feed the stimulable phosphor sheet in an auxiliary scanning direction substantially perpendicular to the main scanning direction.

With the conventional arrangement 1, however, because the stimulable phosphor sheet is held in sliding contact with the guide plate, the stimulable phosphor sheet tends to be smeared and/or damaged, lowering the quality of the image reproduced from the stimulable phosphor sheet and reducing the durability of the stimulable phosphor sheet. The guide plate positioned to support one side of the stimulable phosphor sheet prevents a light collecting system from being positioned on both sides of the stimulable phosphor sheet, but positionally limits the light collecting system to one side of the stimulable phosphor sheet. Consequently, the freedom of the component layout in the apparatus is limited.

With the conventional arrangement 2, since the roller pairs rotate in rolling contact with opposite surfaces of the stimulable phosphor sheet, the stimulable phosphor sheet also tends to be smeared and/or damaged, resulting in the same disadvantages as with the conventional arrangement 1.

SUMMARY OF THE INVENTION

It is a major object of the present invention to provide an image information reading apparatus which is of a relatively simple structure, increases the durability of stimulable phosphor sheets used thereby, and can read radiation image information recorded on stimulable phosphor sheets highly accurately.

According to the present invention, an image information reading apparatus has a stimulating beam system extending in a main direction for applying a stimulating light beam in the main direction to a stimulable phosphor sheet which carries radiation image information of a subject stored therein, and a light collecting system extending in the main direction for collecting photo-stimulated light emitted from the stimulable phosphor sheet in response to the stimulating light beam applied thereto, the stimulating beam system and the light collecting system being disposed in a predetermined range of distances from the stimulable phosphor sheet along the main direction in order to cope with a deformation of the stimulable phosphor sheet in the main direction. The predetermined range of distances refers to the range of the depth of field.

In the image area of the stimulable phosphor sheet, since the stimulating light beam system and the light collecting system, and the stimulable phosphor sheet are held out of contact with each other and maintained at a constant distance from each other along the main direction. Therefore, the stimulable phosphor sheet is prevented from being smeared and/or damaged, and the radiation image information carried thereby can be read efficiently with high accuracy.

When the stimulable phosphor sheet is held in a horizontal attitude for reading the radiation image information therefrom, the stimulable phosphor sheet tends to be flexed under its own weight. Since the stimulating light beam system and the light collecting system are constructed to match the deformation or flexing of the stimulable phosphor sheet, the stimulating light beam system and the light collecting system, and the stimulable phosphor sheet are reliably maintained at a constant distance from each other.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
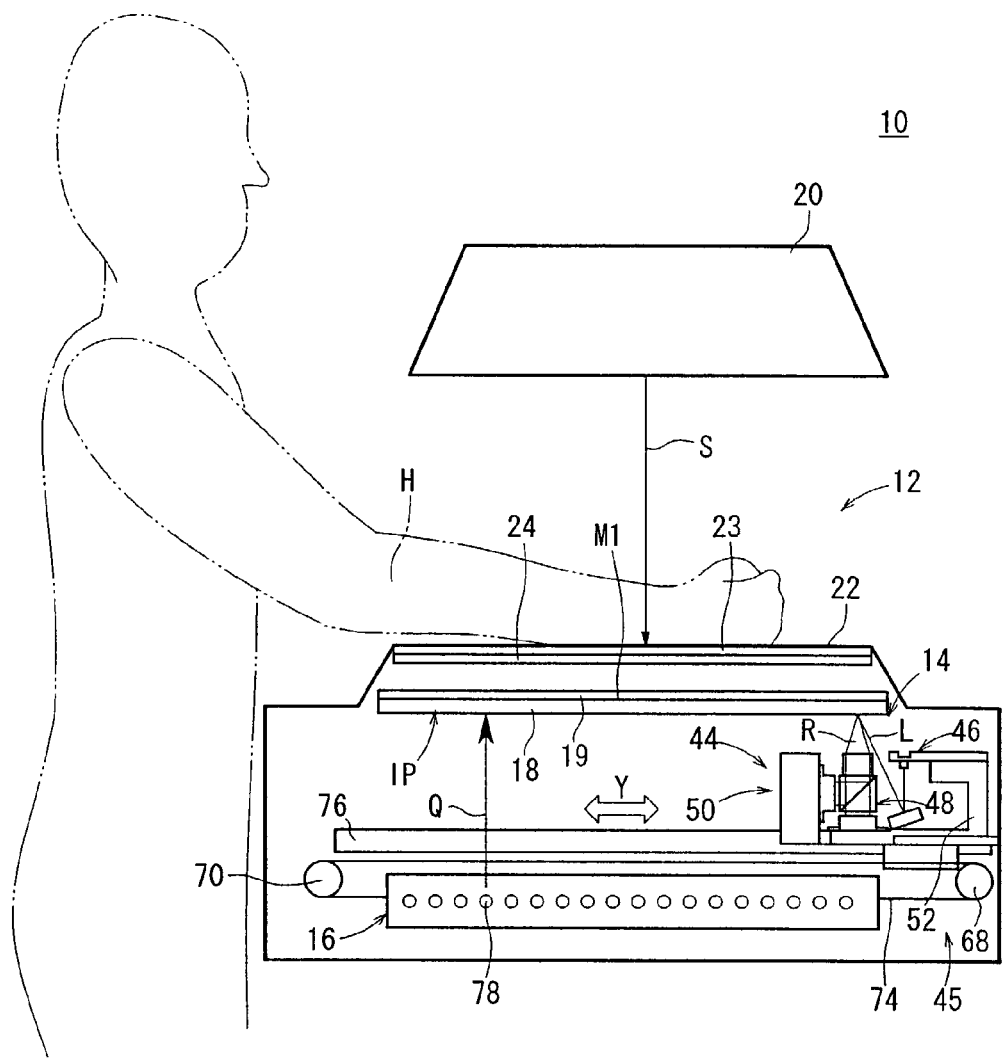
FIG. 1 is a schematic vertical cross-sectional view of a radiation image information recording and reading apparatus according to a first embodiment of the present invention.

FIG. 1 schematically shows in cross section a radiation image information recording and reading apparatus (image information reading apparatus) 10 according to a first embodiment of the present invention.

As shown in FIG. 1, the radiation image information recording and reading apparatus 10 comprises a radiation recording unit 12 for temporarily recording radiation image information of a subject H such as a human body on a stimulable phosphor sheet IP, a reading assembly 14 for applying a stimulating light beam L such as a laser beam to the stimulable phosphor sheet IP and photoelectrically reading photo-stimulated light R emitted from the stimulable phosphor sheet IP depending on the intensity of the radiation image information recorded on the stimulable phosphor sheet IP, and an erasing light source 16 for discharging radiation energy remaining on the stimulable phosphor sheet IP.

Figure 2:
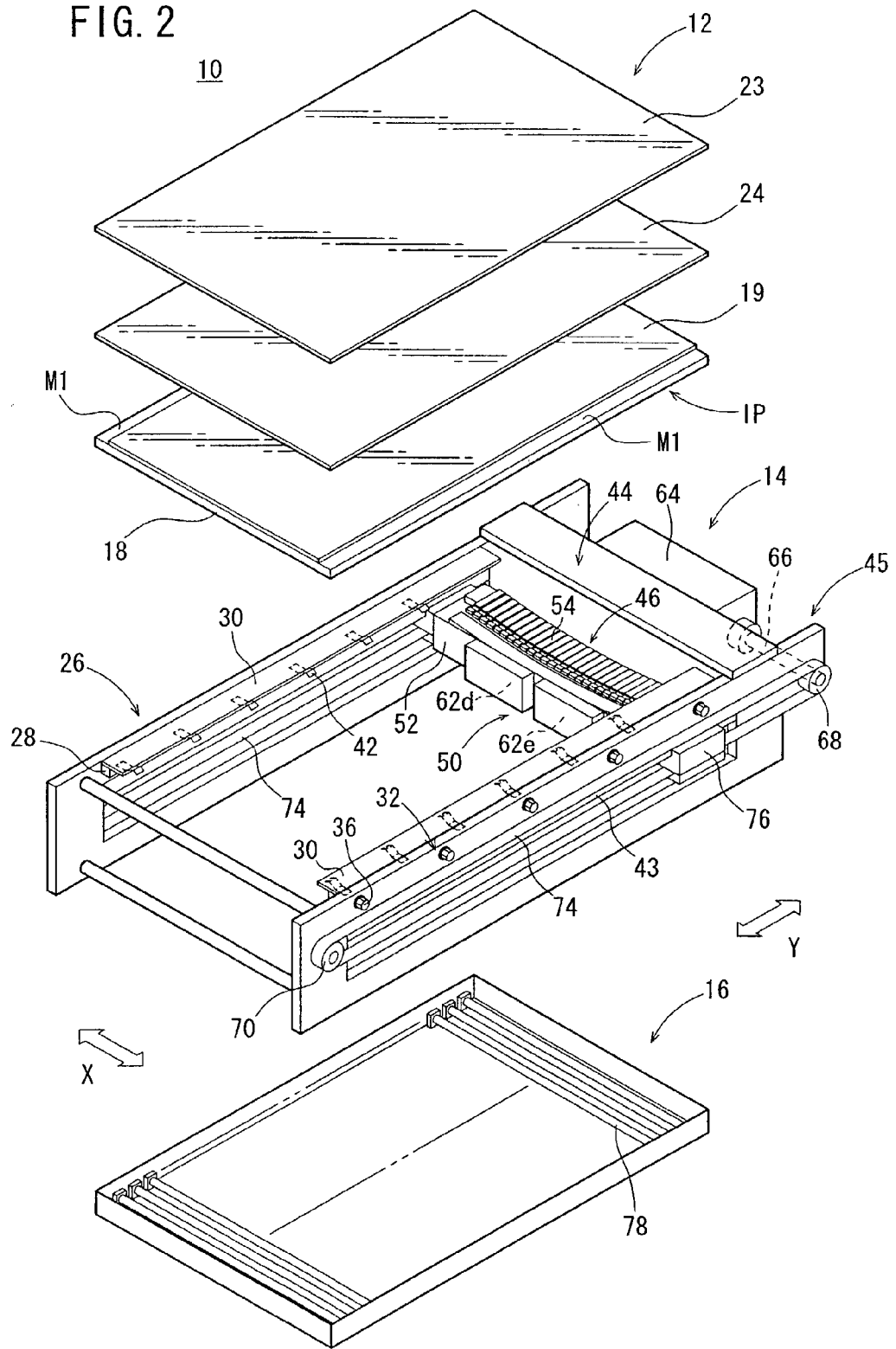
FIG. 2 is an exploded perspective view of an inner structure of the radiation image information recording and reading apparatus shown in FIG. 1.

As shown in FIG. 2, the stimulable phosphor sheet IP comprises a support layer 18 made of glass or metal such as aluminum, and a phosphor layer 19 coated on or bonded to the support layer 18. The support layer 18 has a dimension greater than the phosphor layer 19 in the direction (main direction) indicated by the arrow X and has opposite edges in the direction X which project outwardly beyond the opposite edges of the phosphor layer 19 in the direction X. A reference surface M1 lies in the boundary region between the support layer 18 and the phosphor layer 19. The reference surface M1 is exposed on the opposite edges of the support layer 18 in the direction X.

As shown in FIG. 1, the radiation recording unit 12 has a radiation source 20 for generating a radiation S and a radiation-transmissive exposure table 22 for holding the subject H in a given position. As shown in FIGS. 1 and 2, a photo-timer 23 and a grid 24 for removing scattered light rays are disposed behind the exposure table 22. The stimulable phosphor sheet IP is held in a predetermined exposure position by a fixing mechanism 26 behind the grid 24. The stimulable phosphor sheet IP held in the exposure position has its phosphor layer 19 facing the grid 24.

Figure 3:
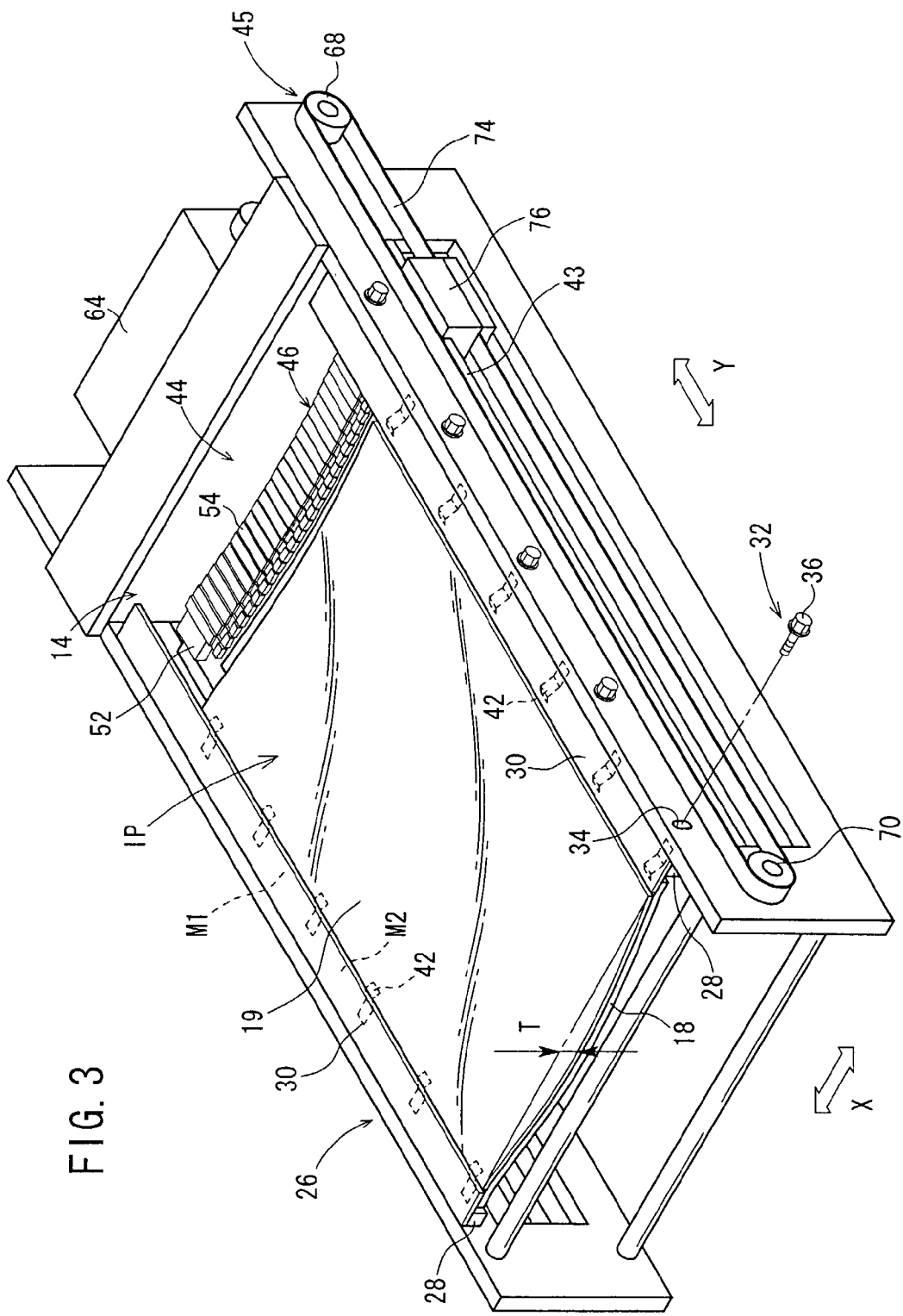
FIG. 3 is a perspective view of a reading assembly of the radiation image information recording and reading apparatus shown in FIG. 1.
Figure 4:
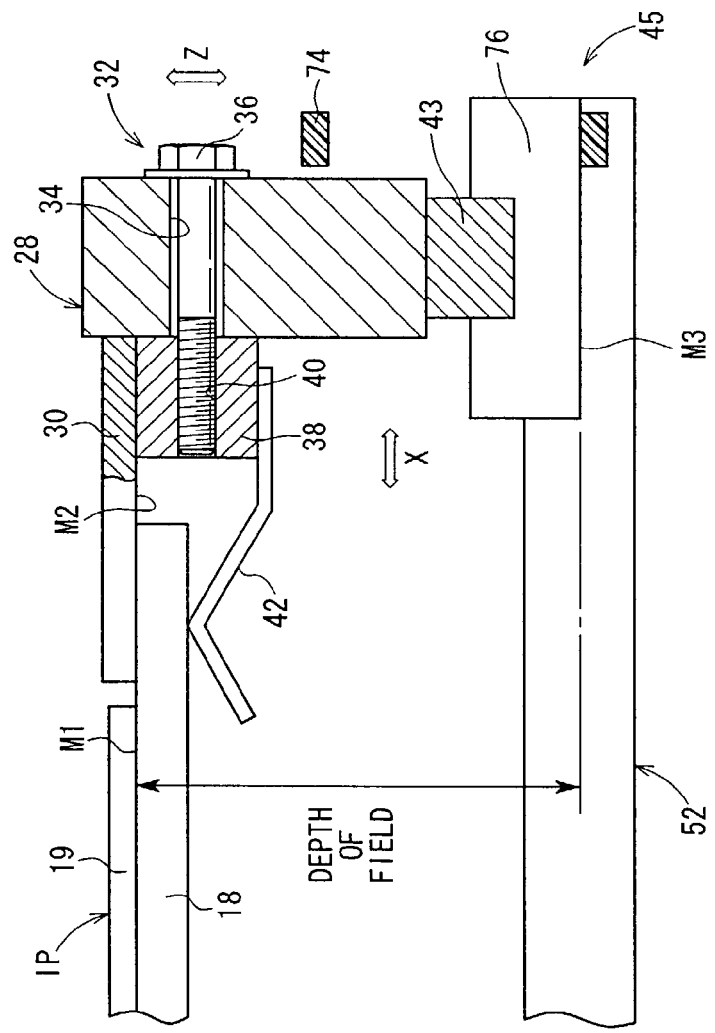
FIG. 4 is an enlarged fragmentary elevational view, partly in cross section, of a fixing mechanism of the radiation image information recording and reading apparatus shown in FIG. 1.

As shown in FIG. 3, the fixing mechanism 26 has a pair of parallel receivers 28 extending in the direction indicated by the arrow Y, which is an auxiliary direction (auxiliary scanning direction), substantially perpendicular to the main direction (the direction X) of the stimulating light beam L, and positioned on opposite ends in the direction X of the stimulable phosphor sheet IP. As shown in FIG. 4, a reference plate 30 is fastened to each of the receivers 28 and positionally adjustable by an adjustor 32 in the direction indicated by the arrow Z (the direction of the depth of field). The reference plate 30 is elongate in the direction Y, and has a sheet attachment surface M2 (see FIG. 4) on its bottom for locating an end in the direction X of the stimulable phosphor sheet IP.

The adjustor 32 has a plurality of fastening screws 36 inserted respectively in a plurality of holes 34 defined through the receiver 28 in the direction X. The fastening screws 36 are positionally adjustable in the respective holes 34 by a given distance in the direction Z. The fastening screws 36 are threaded in respective internally threaded holes 40 defined in a support block 38 to which the reference plate 30 is secured. The support block 38 is elongate in the direction Y. A plurality of leaf springs 42 are mounted on the support block 38 at respectively positions spaced in the direction Y, for pressing the end of the stimulable phosphor sheet IP against the sheet attachment surface M2 of the reference plate 30.

A guide rail 43 extending in the direction Y is fixed to each of the receivers 28. A scanner unit 44, to be described later on, is supported on the guide rail 43. Any of various structures, which is not limited to the leaf springs 42, capable of holding the opposite end of the stimulable phosphor sheet IP, may be mounted on the other receiver 28 which is not shown in FIG. 4.

Since the stimulable phosphor sheet IP supported on the fixing mechanism 26 has its opposite ends in the direction X secured reliably, any deformation (flexing) of the stimulable phosphor sheet IP in the direction Y or the auxiliary direction is minimized. Because the stimulable phosphor sheet IP is held in a horizontal attitude, a substantially central region of the stimulable phosphor sheet IP in the main direction (the direction X) is flexed a maximum distance T downwardly due to its own weight as shown in FIG. 3.

As shown in FIGS. 1 and 2, the reading assembly 14 comprises a scanner unit 44 for reading radiation image information carried by the stimulable phosphor sheet IP, and an auxiliary scanning unit 45 for moving the scanner unit 44 in the horizontal direction (the direction Y).

The scanner unit 44 has a stimulating light beam system 46, a condensing lens array 48, and a CCD line sensor 50 as a light collecting system. The stimulating light beam system 46, the condensing lens array 48, and the CCD line sensor 50 are successively arranged in the main direction and mounted on a scanner head 52.

Figure 5:
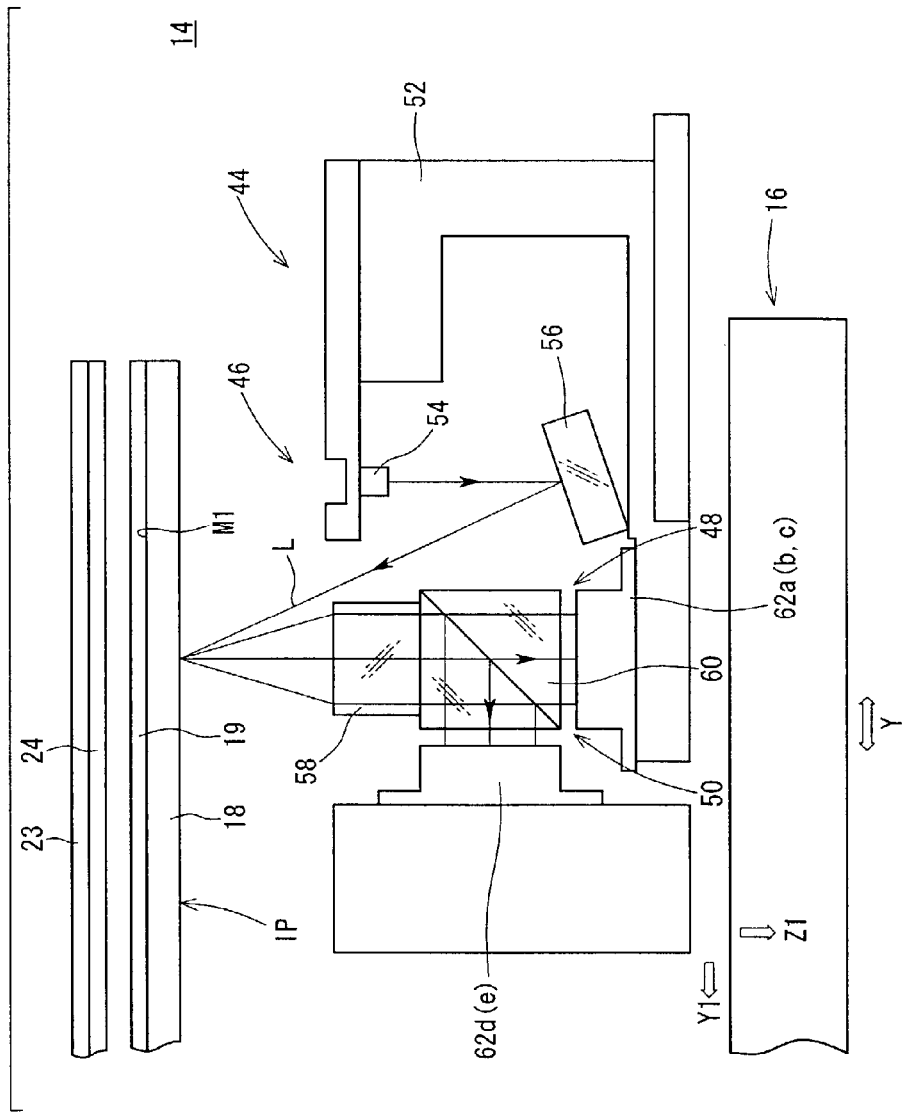
FIG. 5 is an elevational view of the reading assembly shown in FIG. 3.

As shown in FIGS. 3 and 5, the stimulating light beam system 46 has a plurality of laser diodes 54 arrayed in the main direction (the direction X). The laser diodes 54 have respective stimulating light beam outlet ends facing away from the stimulable phosphor sheet IP. Stimulating light beams emitted as scattering light beams from the laser diodes 54 are reflected by a cylindrical mirror 56, and are applied as a linear stimulating light beam L extending in the main scanning direction to the stimulable phosphor sheet IP.

Figure 6:
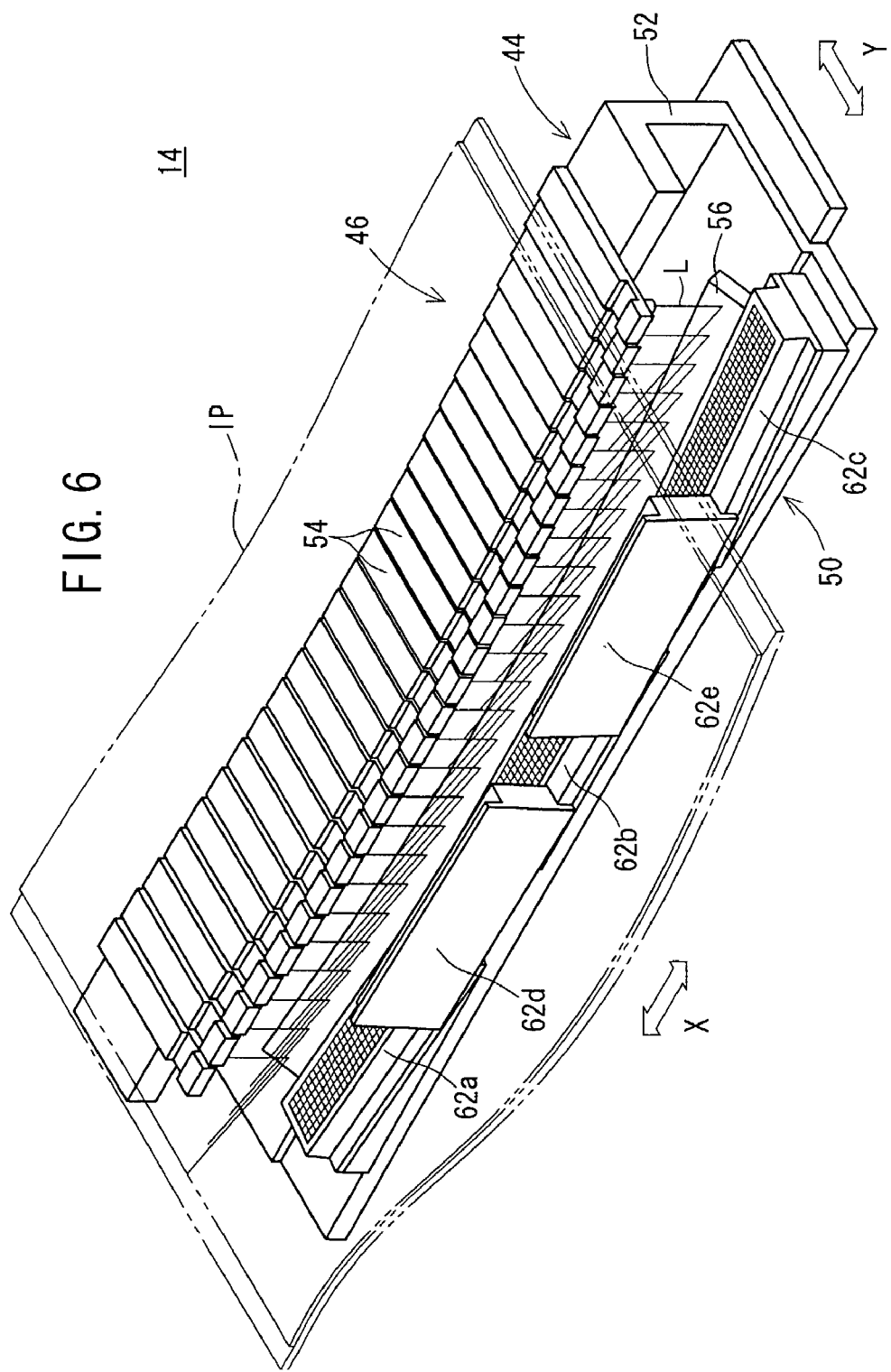
FIG. 6 is a perspective view of a stimulating system and a CCD line sensor of the reading assembly shown in FIG. 5.
Figure 7:
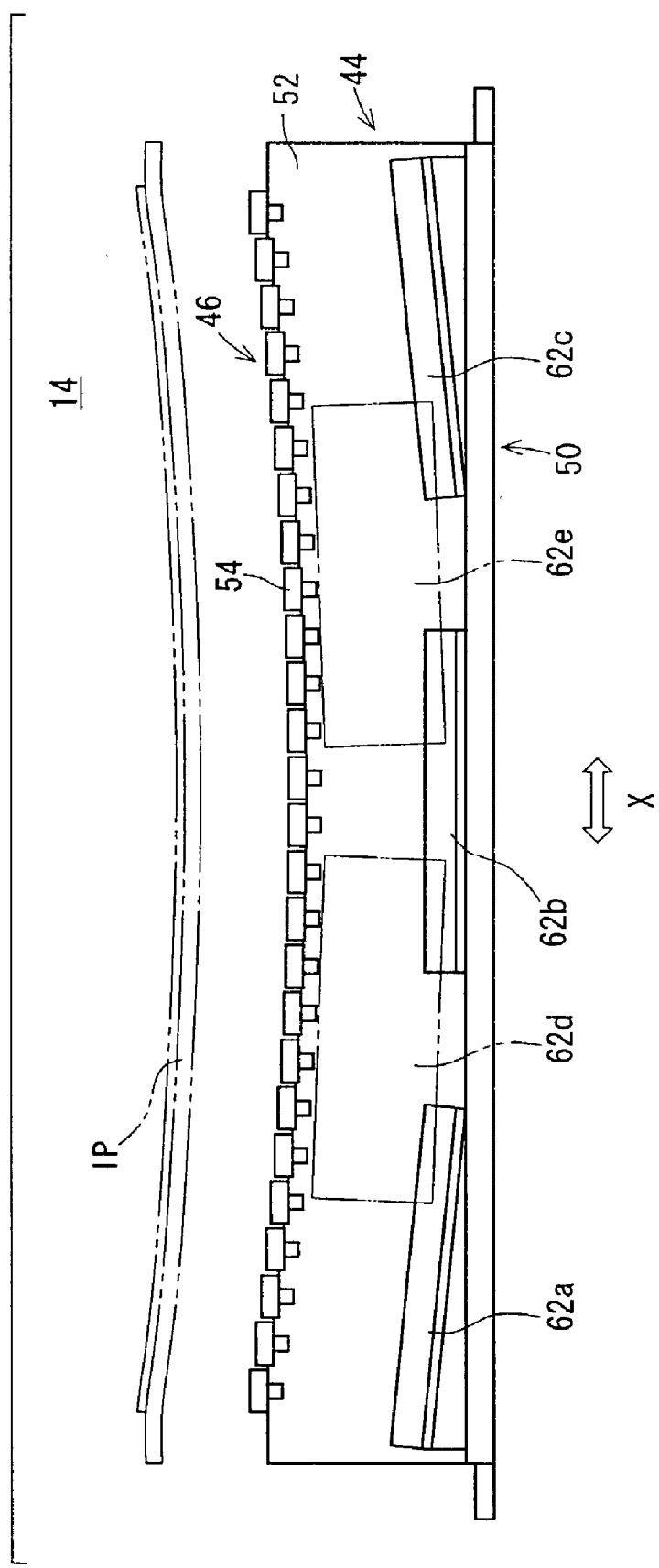
FIG. 7 is a front elevational view of the stimulating system and the CCD line sensor shown in FIG. 6.

As shown in FIGS. 6 and 7, in order to match the deformation or flexing of the stimulable phosphor sheet IP in the direction X, the laser diodes 54 arrayed in the direction X are disposed in a certain range of distances from the stimulable phosphor sheet IP in the direction X. The certain range of distances refers to the range of the depth of field, which is specifically defined as ±100 µm.

The central laser diode 54 in the direction X of the array of laser diodes 54 is disposed in the lowermost position in the above range. The other laser diodes 54 are displaced vertically upwardly in succession or in groups from the central laser diode 54 toward the opposite ends of the array of laser diodes 54 in the direction X. These laser diodes 54 may be thus displaced by either being mounted on a laser diode mount surface of the scanner head 54 which is shaped stepwise or curved continuously to match the deformation or flexing of the stimulable phosphor sheet IP, or having their attachment ends shaped collectively to match the deformation or flexing of the stimulable phosphor sheet IP.

As shown in FIG. 5, the condensing lens array 48 comprises a cylindrical lens 58 mounted on the scanner head 52 and extending in the main direction for condensing photo-stimulating light R emitted from the stimulable phosphor sheet IP, and a prism 60 disposed closely to the cylindrical lens 58 for dividing the photo-stimulating light R into a light beam in the direction indicated by the arrow Z1 (downward direction) and a light beam in the direction indicated by the arrow Y1 (horizontal direction).

The cylindrical lens 58 and the prism 60 are shaped to match the deformation or flexing of the stimulable phosphor sheet IP in the main direction, and positioned in a certain range of distances (the range of the depth of field) from the stimulable phosphor sheet IP. In FIGS. 2, 3, 6, and 7, the condensing lens array 48 is omitted from illustration in order to illustrate the stimulating light beam system 46 and the CCD line sensor 50.

The CCD line sensor 50 comprises a plurality of, e.g., five, CCDs 62a through 62e. The three CCDs 62a, 62b, 62c are disposed below the prism 60 at spaced intervals in the direction X, and the two CCDs 62d, 62e are disposed alongside of the prism 60 between the three CCDs 62a, 62b, 62c (see FIGS. 5 and 6). The CCD 62d is positioned so as to be partly overlapping the CCDs 62a, 62b, and the CCD 62e is positioned so as to be partly overlapping the CCDs 62b, 62c.

The CCDs 62a through 62e are disposed in a certain range of distances from the stimulable phosphor sheet IP in order to match the deformation or flexing of the stimulable phosphor sheet IP in the main direction.

As shown in FIGS. 2 and 3, the auxiliary scanning system 45 has a rotary actuator 64 disposed at one end of the fixing mechanism 26 in the direction Y. Two drive pulleys 68 are fixed to the opposite ends of a rotatable shaft 66 extending from the rotary actuator 64 in the direction X. Driven pulleys 70 are positioned at the other end of the fixing mechanism 26 in the direction Y and spaced a given distance from the drive pulleys 68. Belts 74 are trained around the drive pulleys 68 and the driven pulleys 70. The scanner head 52 is fixed to the belts 74, and linear guides 76 mounted on the opposite ends in the direction X of the scanner head 52 are supported respectively on the guide rails 43.

According to the first embodiment, the stimulable phosphor sheet IP has a reference surface M1 disposed within a certain range of distances from a hypothetical plane that is created by moving the focal point of the stimulating light beam system 46. Specifically, as shown in FIG. 4, the linear guide 76 has a scanner head attachment surface M3 for attaching the scanner head 52 thereto in the auxiliary scanning system 45. The sheet attachment surface M2 is located within a certain range of distances from the scanner head attachment surface M3, e.g., a range of ±100 µm in terms of the depth of field. The reference surface M1 of the stimulable phosphor sheet IP is directly disposed on the sheet attachment surface M2.

The erasing light source 16 is disposed in confronting relation to the stimulable phosphor sheet IP across the reading assembly 14. The erasing light source 16 serves to apply erasing light Q to the stimulable phosphor sheet IP for thereby discharging radiation energy remaining in the stimulable phosphor sheet IP. The erasing light source 16 has a plurality of fluorescent lamps 78 arrayed in the longitudinal direction (the direction Y) of the stimulable phosphor sheet IP and each having a length equal to or greater than the width (the direction X) of the stimulable phosphor sheet IP. The fluorescent lamps 78 apply the erasing light Q to the entire area of the stimulable phosphor sheet IP.

Operation of the radiation image information recording and reading apparatus 10 thus constructed will be described below.

When a patient moves toward the radiation recording unit 12 in order to have radiation image information thereof recorded, the doctor or operator vertically moves the exposure table 22 to establish a recording position. Then, the patient places a body part as the subject H on the exposure table 22, and the doctor or operator energizes the radiation source 20. The radiation source 20 outputs a radiation which passes through the subject H and reaches the phosphor layer 19 of the stimulable phosphor sheet IP, thus recording radiation image information of the subject H in the stimulable phosphor sheet IP.

After the radiation image information of the subject H is recorded in the stimulable phosphor sheet IP, the stimulating light beam system 46 of the reading assembly 14 is energized, and the rotary actuator 64 of the reading assembly 14 is also energized. In the stimulating light beam system 46, the laser diodes 54 arrayed in the main direction (the direction X) of the stimulable phosphor sheet IP are energized to emit respective stimulating light beams, which are then reflected by a cylindrical mirror 56 and applied as a linear stimulating light beam L to the stimulable phosphor sheet IP through the support layer 18 in the direction X.

When the drive pulleys 68 are rotated by the rotary actuator 64 through its rotatable shaft 66, the belts 74 trained around the drive pulleys 68 and the driven pulleys 70 are moved in the circulatory path, moving the scanner head 52 fixed to the belts 74 in the direction Y. The stimulable phosphor sheet IP which is storing the radiation image information is two-dimensionally scanned by the stimulating light beam L, emitting photo-stimulated light R depending on the stored radiation image information.

The emitted photo-stimulated light R travels through the condensing lens array 48 and is applied to the CCD line sensor 50. The photo-stimulated light R applied to the CCD line sensor 50 falls on the CCDs 62a through 62e, which convert the photo-stimulated light R into electric signals, thus photoelectrically reading the radiation image information stored in the stimulable phosphor sheet IP.

After the radiation image information is read from the stimulable phosphor sheet IP, the fluorescent lamps 78 of the erasing light source 16 apply erasing light Q to the stimulable phosphor sheet IP. The stimulable phosphor sheet IP discharges radiation energy remaining therein, and will be used in a next exposure cycle.

The opposite ends in the main direction (the direction X) of the stimulable phosphor sheet IP are supported by the fixing mechanism 26 which extends in the auxiliary direction (the direction Y), thereby holding the stimulable phosphor sheet IP in a horizontal attitude. Therefore, the stimulable phosphor sheet IP tends to flex vertically under its own weight along the direction X.

According to the first embodiment, as shown in FIGS. 6 and 7, the laser diodes 54 of the stimulating light beam system 46 are vertically positioned to match the deformation or flexing of the stimulable phosphor sheet IP along the direction X. The laser diodes 54 are disposed in a certain range of distances from the stimulable phosphor sheet IP, e.g., a range of ±100 μm from the stimulable phosphor sheet IP.

The condensing lens array 48 and the CCDs 62a through 62e of the CCD line sensor 50 are also disposed in a certain range of distances from the stimulable phosphor sheet IP along the direction X to match the deformation or flexing of the stimulable phosphor sheet IP.

When the scanner unit 44 of the reading assembly 14 reads the radiation image information stored in the stimulable phosphor sheet IP while being fed in the direction Y by the auxiliary scanning unit 45, the laser diodes 54 and the CCDs 62a through 62e are spaced from the stimulable phosphor sheet IP by a certain range of distances.

Therefore, the stimulating light beam L is prevented from being brought out of focus on the stimulable phosphor sheet IP, and the efficiency with which to collect the photo-stimulated light R emitted from the stimulable phosphor sheet IP is prevented from changing. Furthermore, the laser diodes 54 and the CCDs 62a through 62e are prevented from being displaced too closely to the stimulable phosphor sheet IP, and also from being spaced from their desired positions.

Since the laser diodes 54 and the CCDs 62a through 62e are kept out of contact with the stimulable phosphor sheet IP, the stimulable phosphor sheet IP is prevented from being smeared or damaged and hence remains highly durable. In addition, the image produced from the radiation image information is reliably prevented from becoming worse and lowered in quality due to density changes, and the radiation image information is read highly accurately efficiently.

The reading assembly 14 can be positioned remotely from the exposure surface of the stimulable phosphor sheet IP. Accordingly, the radiation image information recording and reading apparatus 10 can easily be designed for a reduced size.

When the stimulable phosphor sheet IP is secured to the fixing mechanism 26, the stimulable phosphor sheet IP tends to flex differently owing to variations of the stimulable phosphor sheet IP itself, the planarity of the stimulable phosphor sheet IP, the accuracy of the reference plate 30, or the accuracy of the scanner head 52.

According to the present invention, the above variations are detected or predicted in advance, and the various components are adjusted to keep the sum of the variations within the range of depths of field. As a result, when the stimulable phosphor sheet IP is replaced with another one, it is not necessary to adjust the stimulating light beam system 46, the condensing lens array 48, and the CCD line sensor 50, so that the entire process of replacing the stimulable phosphor sheet IP is simplified.

Moreover, the secured state of the stimulable phosphor sheet IP on the fixing mechanism 26 may be adjusted to adjust the flexed shape of the stimulable phosphor sheet IP to match the layout of the stimulating light beam system 46, the condensing lens array 48, and the CCD line sensor 50.

According to the first embodiment, as shown in FIG. 4, the scanner head attachment surface M3 for attaching the scanner head 52 thereto and the sheet attachment surface M2 of the reference plate 30 which is positionally adjustable with respect to the receiver 28 in the direction Z by the adjustor 32 are positioned in a certain distanced range, i.e., the range of the depth of field, with respect to each other.

Specifically, the tip ends of the fastening screws 36 of the adjustor 32 are loosened in the internally threaded holes 40, and then the fastening screws 36 are positioned within the internally threaded holes 40 in the direction Z. Then, the fastening screws 36 are tightened again to secure the support block 38 to the receiver 28, thus positionally adjusting the sheet attachment surface M2 of the reference plate 30 which is fixed to the support block 38.

The stimulable phosphor sheet IP is disposed against the sheet attachment surface M2 of the reference plate 30. The reference surface M1 which lies in the boundary region between the support layer 18 and the phosphor layer 19 is held in direct contact with the sheet attachment surface M2 of the reference plate 30.

The reference surface M1 kept in direct contact with the sheet attachment surface M2 serves to effectively reduce variations of the depth of field, and allow the stimulating light beam system 46 and the CCD line sensor 50 of the reading assembly 14 and the phosphor layer 19 to be positioned accurately at a constant distance from each other along the main direction. Therefore, the CCDs 62a through 62e, in particular, can be used under good conditions, and the radiation image information recording and reading apparatus 10 can easily be designed for a size reduction and can easily speed up its reading process.

Since the reference surface M1 which lies in the boundary region between the support layer 18 and the phosphor layer 19 is held in close contact with the sheet attachment surface M2 of the reference plate 30, the sheet attachment surface M2 and the reference surface M1 are placed in exactly the same plane. Accordingly, the distance between the scanner head attachment surface M3 and the reference surface M1 are positioned highly accurately in the range of the depth of field, so that the radiation image information reading process can efficiently be performed with a simple arrangement.

Figure 8:
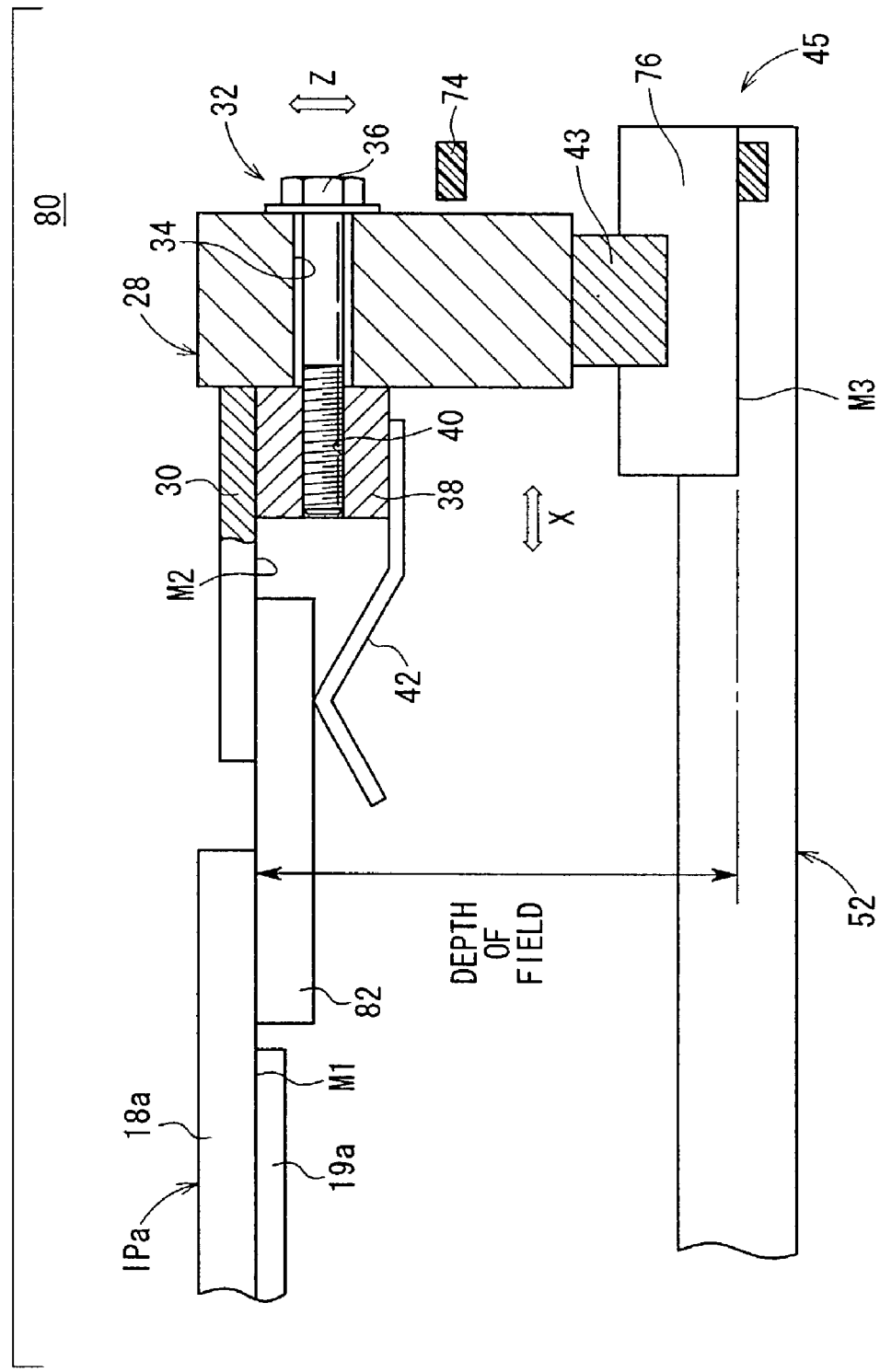
FIG. 8 is an enlarged fragmentary elevational view, partly in cross section, of a fixing mechanism of a radiation image information recording and reading apparatus according to a second embodiment of the present invention.

FIG. 8 shows, in enlarged fragmentary elevation, partly in cross section, a fixing mechanism 80 of a radiation image information recording and reading apparatus according to a second embodiment of the present invention. Those parts of the fixing mechanism 80 which are identical to those of the fixing mechanism 26 of the radiation image information recording and reading apparatus 10 according to the first embodiment are denoted by identical reference characters, and will not be described in detail below.

A stimulable phosphor sheet IPa secured to the fixing mechanism 80 comprises a support layer 18*a* and a phosphor layer 19*a*. A joint plate 82 is fixed to each of the opposite ends in the direction X of the support layer 18*a* on a surface thereof on which the phosphor layer 19*a* is mounted. The joint plate 82 projects outwardly from each of the opposite ends in the direction X of the support layer 18*a*, and is pressed against the sheet attachment surface M2 of the reference plate 30 by the leaf springs 42. The stimulable phosphor sheet IPa is oriented in a direction opposite to the direction in which the stimulable phosphor sheet IP is oriented, i.e., has the support layer 18*a* facing a grid (not shown).

In the second embodiment, the joint plate 82 fixed to the stimulable phosphor sheet IPa is pressed against the sheet attachment surface M2 of the reference plate 30 by the leaf springs 42, and the sheet attachment surface M2 and the reference surface M1 of the stimulable phosphor sheet IPa are placed in exactly the same plane.

Consequently, the distance between the scanner head attachment surface M3 and the reference surface M1 can be kept accurately in the range of the depth of field, providing the same advantages as those of the first embodiment. Furthermore, the support layer 18*a* and the phosphor layer 19*a* can be arranged in a sequence opposite to the sequence of the support layer 18*a* and the phosphor layer 19*a* of the stimulable phosphor sheet IP.

In the first and second embodiments, the support layers 18, 18*a* are made of glass. However, the support layers 18, 18*a* may be made of metal, e.g., aluminum. In an example, the support layers 18, 18*a* had a dimension of 460 mm in each of the directions X, Y and a thickness of 12 mm, the stimulable phosphor sheets IP, IPa were flexed 19 µm under their own weight when the free ends thereof at two sides were supported in a horizontal attitude. The support layers 18, 18*a* of aluminum could be machined to a planarity of 20 µm or less. As a whole, the reference surface M1 were placed in a range of ±100 µm in terms of the depth of field.

The stimulable phosphor sheets IP, IPa are likely to vibrate when held in a planar configuration. When the stimulable phosphor sheets IP, IPa are vibrated, the distance thereof from the reading assembly 14 is periodically varied, tending to produce density irregularities in images which are generated from the radiation image information stored in the stimulable phosphor sheets IP, IPa. The stimulable phosphor sheets IP, IPa may be forcibly deformed into a curved shape by the fixing mechanisms 26, 80 to prevent themselves from being vibrated.

In the first and second embodiments, the reference surface M1 is provided on the stimulable phosphor sheets IP, IPa. However, the reference surface M1 may be provided in the apparatus, i.e., on the fixing mechanisms 26, 80, and only the stimulable phosphor sheets IP, IPa may be removable. Specifically, the stimulable phosphor sheets IP, IPa may be fixed in position by a peelable adhesive, screws, or the like, or may be sandwiched by two plates.

In the first and second embodiments, the radiation image information recording and reading apparatus 10 is of a horizontal type which reads the radiation image information carried on the stimulable phosphor sheet that is held in a horizontal attitude. However, the radiation image information recording and reading apparatus may be of a vertical type which reads the radiation image information carried on the stimulable phosphor sheet that is held in a vertical attitude.

Figure 9:
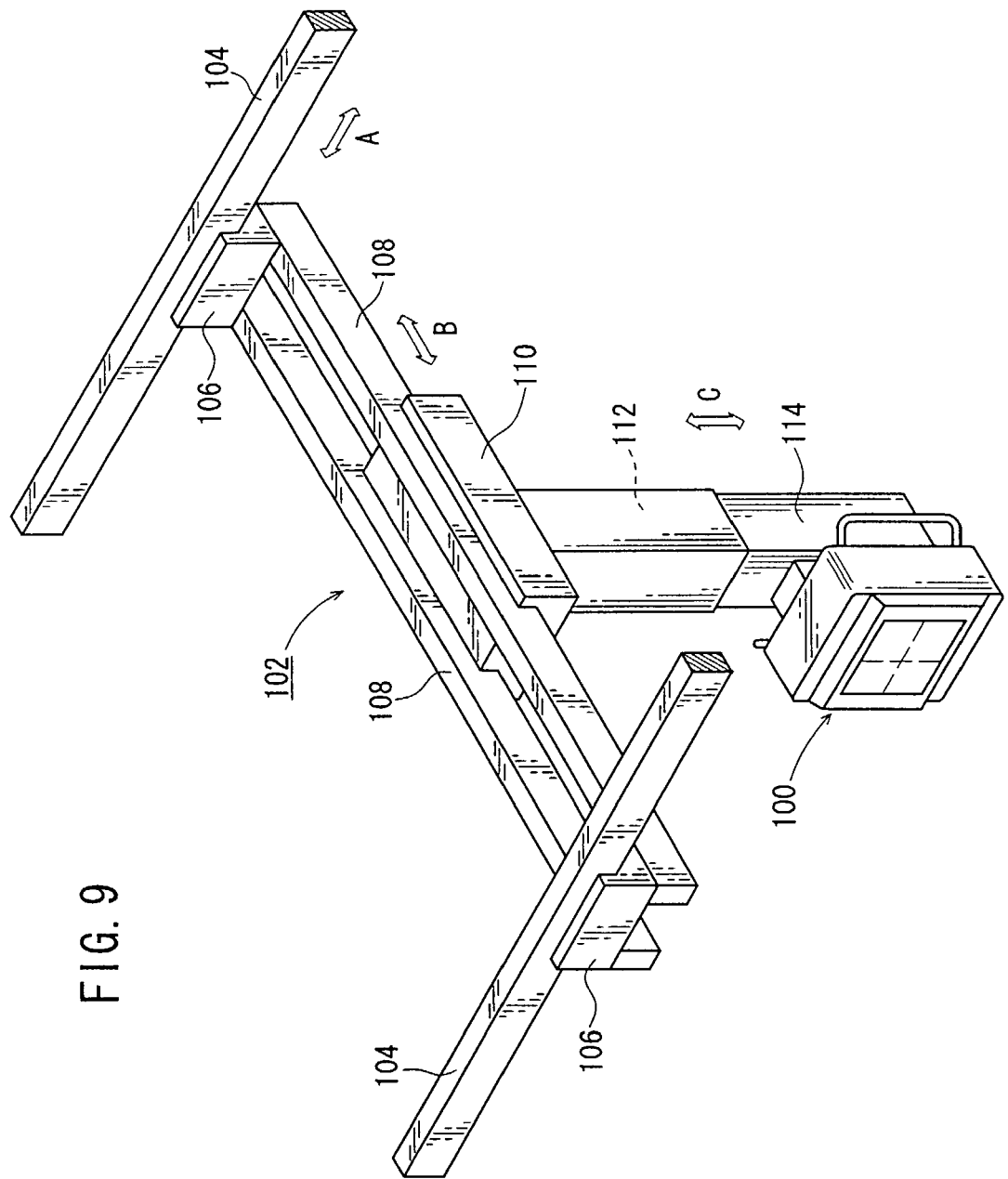
FIG. 9 is a perspective view of a radiation image information recording and reading apparatus according to a third embodiment of the present invention and a moving apparatus for moving the radiation image information recording and reading apparatus according to the third embodiment.

FIG. 9 shows in perspective a radiation image information recording and reading apparatus 100 of the vertical type according to a third embodiment of the present invention and a moving apparatus 102 for moving the radiation image information recording and reading apparatus 100.

The radiation image information recording and reading apparatus 100 is of a structure identical to the radiation image information recording and reading apparatus 10, and will not be described in detail below.

The moving apparatus 102 has a pair of parallel A-axis rails 104 fixed to a ceiling and extending in the direction indicated by the arrow A, and a pair of A-axis self-propelled carriages 106 on the respective rails 104 for movement therealong in the direction A. Two parallel B-axis rails 108 extending in the direction indicated by the arrow B, perpendicular to the direction A, have both ends fixed to the A-axis self-propelled carriages 106. A B-axis self-propelled carriage 110 is mounted on the B-axis rails 108 and movable therealong in the direction B. The B-axis self-propelled carriage 110 supports thereon a hydraulic cylinder 112 which extends downwardly. The radiation image information recording and reading apparatus 100 is mounted on the lower tip end of a lifting and lowering device 114 which extends downwardly from the hydraulic cylinder 112 in the direction indicated by the arrow C.

The moving apparatus 102 operates as follows: The A-axis self-propelled carriages 106 move back and forth on the respective rails 104 in the direction A, the B-axis self-propelled carriage 110 moves back and forth on the B-axis rails 108 in the direction B, and the lifting and lowering device 114 moves back and forth in the direction C. Therefore, the radiation image information recording and reading apparatus 100 can move in the directions A, B, C which extend along three axes that are perpendicular to each other. The moving apparatus 102 for moving the radiation image information recording and reading apparatus 100 allows the radiation image information recording and reading apparatus 100 to operate easily for capturing radiation image information of subjects located in various positions in a three-dimensional space.

In the first through third embodiments, the radiation image information recording and reading apparatus have been described as the image information reading apparatus. However, the principles of the present invention are also applicable to an apparatus for reading, from a stimulable phosphor sheet loaded therein, radiation image information which has been recorded on the stimulable phosphor sheet by a separate radiation image information recording apparatus.

In the image information reading apparatus according to the present invention, the stimulating light beam system and the light collecting system, and the image carrying area of the stimulable phosphor sheet are held out of contact with each other and maintained at a constant distance from each other along the main direction. Therefore, the stimulable phosphor sheet is prevented from being smeared and/or damaged, and the radiation image information carried thereby can be read efficiently with high accuracy.

When the stimulable phosphor sheet is held in a horizontal attitude for reading the radiation image information therefrom, the stimulable phosphor sheet tends to be flexed under its own weight. Since the stimulating light beam system and the light collecting system are constructed to match the deformation or flexing of the stimulable phosphor sheet, the stimulating light beam system and the light collecting system, and the stimulable phosphor sheet are reliably maintained at a constant distance from each other.

For recording radiation image information on the stimulable phosphor sheet which is being placed in the image information reading apparatus, the reading assembly can be positioned remotely from the exposure surface of the stimulable phosphor sheet. Consequently, the image information reading apparatus can easily be designed for a reduced size. In addition, the stimulable phosphor sheet is prevented from becoming deteriorated due to being fed, and has its durability increased effectively.

Although certain preferred embodiments of the present invention have been shown and described in detail, it should be understood that various changes and modifications may be made therein without departing from the scope of the appended claims.

What is claimed is:

1. An image information reading apparatus comprising:
   a reading assembly for applying a stimulating light beam in a main direction to a stimulable phosphor sheet which carries radiation image information of a subject stored therein, and reading photo-stimulated light emitted from said stimulable phosphor sheet in response to the stimulating light beam applied thereto; and
   an auxiliary scanning system for feeding said reading assembly and said stimulable phosphor sheet relatively to each other in an auxiliary direction which is substantially perpendicular to said main direction;
   said reading assembly comprising:
      a stimulating beam system extending in said main direction for applying said stimulating light beam to said stimulable phosphor sheet; and
      a light collecting system extending in said main direction for collecting the photo-stimulated light emitted from said stimulable phosphor sheet in response to the stimulating light beam applied thereto;
      said stimulating beam system and said light collecting system being disposed in a predetermined range of distances from said stimulable phosphor sheet along flexing of said stimulable phosphor sheet in said main direction.

2. An image information reading apparatus according to claim 1, further comprising:
   a fixing mechanism having a pair of receivers extending in said auxiliary direction for holding opposite ends in said main direction of said stimulable phosphor sheet parallel to each other.

3. An image information reading apparatus according to claim 1, further comprising:
   a reference surface placed in a given range of distances from a hypothetical plane created by moving the focal point of said stimulating light beam system;
   said stimulable phosphor sheet being held in close contact with said reference surface.

4. An image information reading apparatus according to claim 3, wherein said stimulable phosphor sheet comprises:
   a support layer and a phosphor layer mounted thereon, said reference surface lying in a boundary region between said support layer and said phosphor layer;
   said auxiliary scanning system comprising means for feeding said reading assembly in said auxiliary direction and having a reading assembly attachment surface for attaching said reading assembly thereto;
   said image information reading apparatus further comprising:
   a sheet attachment surface disposed in a predetermined range of distances from said reading assembly attachment surface, said reference surface being held against said sheet attachment surface.

5. An image information reading apparatus according to claim 4, wherein said support layer has a dimension in said main direction which is greater than said phosphor layer, said support layer having opposite ends in said main direction directly placed on said sheet attachment surface.

6. An image information reading apparatus according to claim 4, further comprising:
   joint plates secured respectively to the opposite ends in said main direction of said support layer on a surface thereon on which said phosphor layer is mounted, said joint plates being supported on said sheet attachment surface.

7. An image information reading apparatus according to claim 1, wherein said stimulating light beam system comprises a plurality of laser diodes arrayed in said main direction, said laser diodes being disposed in a predetermined distance range represented by the depth of field from said stimulable phosphor sheet along said main direction.

8. An image information reading apparatus according to claim 1, wherein said light collecting system comprises a plurality of CCDs arrayed in said main direction, said CCDs being disposed in a predetermined distance range represented by the depth of field from said stimulable phosphor sheet along said main direction.

9. An image information reading apparatus according to claim 1, wherein said stimulable phosphor sheet comprises:
   a support layer and a phosphor layer mounted thereon, with a reference surface lying in a boundary region between said support layer and said phosphor layer;
   said auxiliary scanning system comprising means for feeding said reading assembly in said auxiliary direction and having a reading assembly attachment surface for attaching said reading assembly thereto;
   said image information reading apparatus further comprising:
   a sheet attachment surface disposed in a predetermined range of distances from said reading assembly attachment surface, said reference surface being held against said sheet attachment surface.

10. An image information reading apparatus according to claim 1, wherein said stimulable phosphor sheet comprises a support layer and a phosphor layer mounted thereon, wherein said support layer has a dimension in said main direction which is greater than said phosphor layer, said support layer having opposite ends in said main direction directly placed on a sheet attachment surface of the auxiliary scanning system.

11. The system according to claim 10, wherein joint plates secured respectively to the opposite ends in said main direction of said support layer on a surface thereon on which said phosphor layer is mounted, said joint plates being supported on said sheet attachment surface.

12. The system according to claim 1, wherein the light collecting system includes optics disposed upstream of a light collector, and wherein the optics have a curvature to compensate for the deformation of the sheet.

13. The system according to claim 1, wherein the auxiliary scanning system feeds the reading assembly and phosphor sheet relative to each other in a non-contact manner.

14. An image information reading apparatus comprising:
a reading assembly for applying a stimulating light beam in a main direction to a stimulable phosphor sheet which carries radiation image information of a subject stored therein, and reading photo-stimulated light emitted from said stimulable phosphor sheet in response to the stimulating light beam applied thereto; and
an auxiliary scanning system for feeding said reading assembly and said stimulable phosphor sheet relatively to each other in an auxiliary direction which is substantially perpendicular to said main direction;
said reading assembly comprising:
- a stimulating beam system extending in said main direction for applying said stimulating light beam to said stimulable phosphor sheet; and
- a light collecting system extending in said main direction for collecting the photo-stimulated light emitted from said stimulable phosphor sheet in response to the stimulating light beam applied thereto; and
- said light collecting system being disposed in a predetermined range of distances from said stimulable phosphor sheet along said main direction in order to cope with a deformation of said stimulable phosphor sheet in said main direction,
- a reference surface placed in a given range of distances from a hypothetical plane created by moving the focal point of said stimulating light beam system;
- said stimulable phosphor sheet being held in close contact with said reference surface.

15. An image information reading apparatus comprising:
a reading assembly for applying a stimulating light beam in a main direction to a stimulable phosphor sheet which carries radiation image information of a subject stored therein, and reading photo-stimulated light emitted from said stimulable phosphor sheet in response to the stimulating light beam applied thereto; and
au auxiliary scanning system for feeding said reading assembly and said stimulable phosphor sheet relatively to each other in an auxiliary direction which is substantially perpendicular to said main direction:
said reading assembly comprising a stimulating beam system extending in said main direction for applying said stimulating light beam to said stimulable phosphor sheet along flexing of said stimulable phosphor sheet in said main direction.

* * * * *